J. J. SHULTS.
NUT LOCK.
APPLICATION FILED JAN. 5, 1911.
1,063,397.
Patented June 3, 1913.
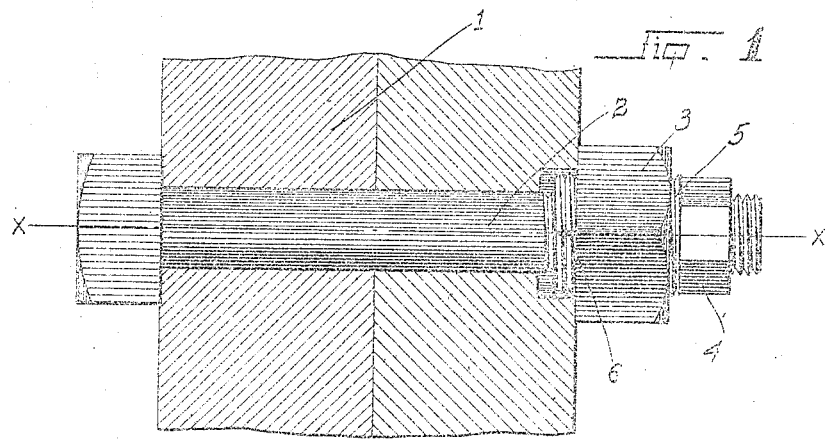
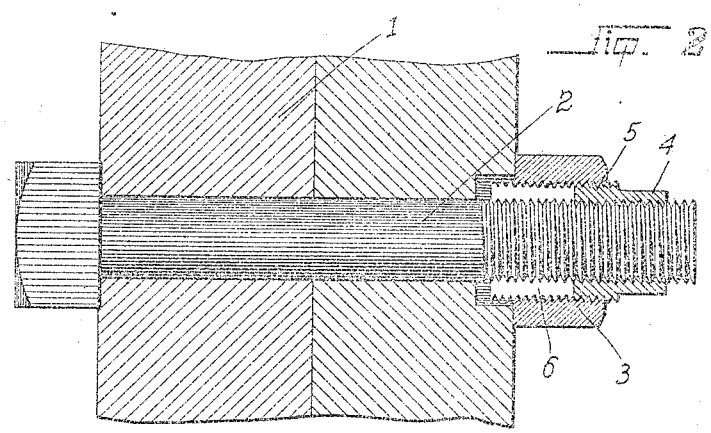
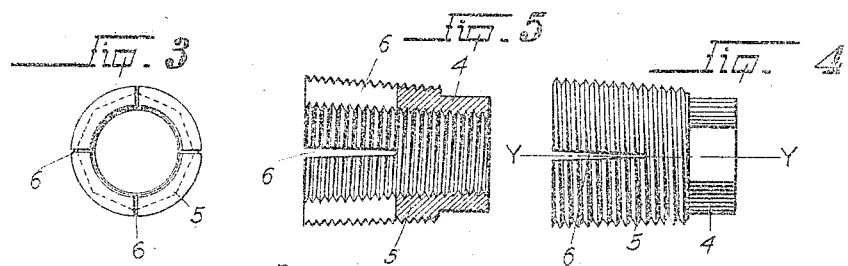
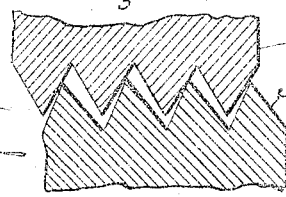
Witnesses
Inventor
John J. Shults
By Berry D. Webster
Attorney

UNITED STATES PATENT OFFICE.

JOHN J. SHULTS, OF PASKENTA, CALIFORNIA.

NUT-LOCK.

1,063,397.   Specification of Letters Patent.   Patented June 3, 1913.

Application filed January 5, 1911.   Serial No. 600,948.

*To all whom it may concern:*

Be it known that I, JOHN J. SHULTS, a citizen of the United States, residing at Paskenta, in the county of Tehama, State of California, have invented certain new and useful Improvements in Nut-Locks; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in nut and bolt mechanisms, the particular object of the invention being to produce a nut lock whereby when a nut is once inserted in position on its bolt it will not become loosened or unsecured from the bolt until such time as it is desired, thus preventing accidents such as rail spreading and other serious disasters which occur by reason of nuts becoming loosened from their proper position upon the bolt.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1 is a side elevation of my complete mechanism showing the nut lock in position. Fig. 2 is a sectional view taken on a line x—x of Fig. 1. Fig. 3 is an end view of an auxiliary locking nut. Fig. 4 is a side elevation of the same. Fig. 5 is a sectional view taken on a line Y—Y of Fig. 4. Fig. 6 is a fragmentary view showing the manner in which the threads of the locking nut engage the threads of the bolt.

Referring now more particularly to the characters of reference on the drawings, 1 designates the parts to be bolted together, and 2 the usual bolt inserted therein, and 3 the usual nut of any type desired.

In using my device, I provide an auxiliary nut 4 having a threaded projecting shank 5 which member 5 has an interior threaded orifice conforming with the threaded portion of the nut 4. Said member 5 is provided with a plurality of longitudinal cuts or incisions 6 cut inwardly from its inner end, which incisions 6 permit the exterior and the interior longitudinal sides of said member 5 to be flared outwardly as shown in Figs. 4 and 5.

In practice the nut 4 and shank 5 is first screwed upon the bolt 2 and then the nut 3 is screwed upon the shank 5 compressing it inwardly to its straight position with respect to the member 4, thus bringing the sides of the incision 6 together and causing the spring or friction effect of this operation to hold the nut 3 tightly in whatever position it is left in to prevent it from backing down or becoming loosened until it is so desired.

From this description it will readily appear that I have produced such a nut lock as substantially fulfills the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

A nut lock comprising a member to be bolted, such member being provided with a recess in its side, a bolt projecting through said member and said recess, an auxiliary nut mounted on said bolt and projecting into the said recess, a threaded shank on said auxiliary nut, said shank having a plurality of longitudinal incisions cut in its inner end permitting said shank to be flared outwardly, and a nut mounted on said shank and abutting against the part to be bolted, as described.

In testimony whereof I affix my signature in presence of two witnesses.

JOHN J. SHULTS.

Witnesses:
 L. W. WARMOTH,
 P. A. OAKS.